United States Patent
Schwartz et al.

(10) Patent No.: US 9,985,450 B2
(45) Date of Patent: May 29, 2018

(54) RELAY FOR USE WITH MULTIPLE POWER SOURCES

(71) Applicant: LITTELFUSE, INC., Chicago, IL (US)

(72) Inventors: Geoffrey Schwartz, Stoughton, MA (US); Brian D. Crispim, Salem, NH (US)

(73) Assignee: LITTELFUSE, INC., Chicago, IL (US)

( * ) Notice: Subject to any disclaimer, the term of this patent is extended or adjusted under 35 U.S.C. 154(b) by 112 days.

(21) Appl. No.: 15/153,002

(22) Filed: May 12, 2016

(65) Prior Publication Data

US 2017/0331310 A1 Nov. 16, 2017

(51) Int. Cl.
*H02J 7/00* (2006.01)
*H02J 7/34* (2006.01)
*H02J 1/00* (2006.01)
*H02J 1/10* (2006.01)

(52) U.S. Cl.
CPC ............. *H02J 7/0055* (2013.01); *H02J 1/10* (2013.01); *H02J 7/0024* (2013.01)

(58) Field of Classification Search
CPC ........... H02J 7/0055; H02J 7/0024; H02J 1/10
USPC .................. 320/107, 138; 307/18, 29, 71, 38
See application file for complete search history.

(56) References Cited

U.S. PATENT DOCUMENTS

| | | | | |
|---|---|---|---|---|
| 2,460,860 A * | 2/1949 | Volpigno | ............. | H02H 11/002 361/112 |
| 4,044,268 A | 8/1977 | Hammel et al. | | |
| 5,111,059 A * | 5/1992 | Woodworth | ............. | H02J 3/04 307/64 |
| 5,128,552 A * | 7/1992 | Fang | ....................... | G04G 19/10 307/64 |
| 5,341,075 A * | 8/1994 | Cocconi | ............. | B60L 11/1811 307/66 |
| 5,355,071 A * | 10/1994 | Ishida | ................... | H02J 7/1423 320/110 |
| 5,506,456 A | 4/1996 | Yang | | |
| 5,881,215 A * | 3/1999 | Alft | ...................... | G06F 11/2015 307/131 |
| 6,400,043 B1 * | 6/2002 | Batson | .................... | H02J 7/025 307/66 |
| 6,583,522 B1 | 6/2003 | McNulty et al. | | |
| 7,786,677 B2 * | 8/2010 | Chen | ................... | B60Q 1/0088 307/10.8 |

(Continued)

OTHER PUBLICATIONS

ISR and Written Opinion dated Jul. 17, 2017 in corresponding PCT/US2017/031006.

*Primary Examiner* — M'Baye Diao

(57) ABSTRACT

Provided herein is a relay architecture for selecting between multiple power sources. In one approach, a first relay and first power source are electrically coupled to a first terminal. A second relay and second power source are electrically coupleable to a second terminal and to the first relay. A load is electrically coupled with at least one of the following in the case that a load voltage is below a predetermined threshold: the first terminal, the second terminal, and a third power source, wherein a power supply is provided to the load by the first power source in the case that the first power source is coupled to the first terminal. The power supply is provided to the load by the second power source when the second power source is coupled to the second terminal and the first power source is disconnected from the first terminal.

18 Claims, 2 Drawing Sheets

(56) References Cited

U.S. PATENT DOCUMENTS

| | | | |
|---|---|---|---|
| 8,004,242 B1 | 8/2011 | Purkey et al. | |
| 8,587,261 B2* | 11/2013 | Sassen | H02J 7/0027 320/115 |
| 8,810,198 B2* | 8/2014 | Nergaard | B60L 1/003 320/109 |
| 8,896,152 B2* | 11/2014 | Beg | H02J 9/061 307/64 |
| 9,102,241 B2* | 8/2015 | Brabec | B60L 11/1861 |
| 9,197,949 B2* | 11/2015 | Indovina | G01R 19/2513 |
| 9,787,209 B2* | 10/2017 | Dighrasker | H02M 5/42 |
| 2007/0124606 A1* | 5/2007 | Hsieh | G06F 1/3215 713/300 |
| 2008/0258683 A1 | 10/2008 | Chang | |
| 2012/0146588 A1* | 6/2012 | Ishibashi | H02J 7/0018 320/138 |
| 2013/0127399 A1 | 5/2013 | Tang et al. | |
| 2014/0111006 A1* | 4/2014 | Baldassarre | H02J 9/002 307/23 |
| 2014/0306526 A1* | 10/2014 | Fontana | H02J 3/00 307/24 |

* cited by examiner

RELAY FOR USE WITH MULTIPLE POWER SOURCES

FIELD OF THE DISCLOSURE

The disclosure relates generally to relays and, more particularly, to relays used with multiple power sources supplying a load.

BACKGROUND OF THE DISCLOSURE

Automobiles include multiple electrical subsystems (or "auxiliary loads") that utilize electrical energy when the vehicle is running, and may also utilize electrical energy provided by the vehicle's battery when the engine is in an inactive or power-off condition. In order to preserve sufficient power for all electrical subsystems, measures must generally be taken to avoid discharging the battery below a predetermined threshold voltage. The construction of the vehicle battery is well-known, and generally comprises a plurality of connected rechargeable lead-acid secondary cells.

In addition to various auxiliary loads powered by the vehicles electrical system, other integrated systems may have generally independent power sources. Managing distribution of vehicle power between multiple power sources remains a challenge.

SUMMARY

In view of the foregoing, described herein are one or more relays for selecting between multiple power sources. In one approach, a first relay is electrically coupled to a first terminal, wherein a first power source is coupleable with the first terminal. A second relay is electrically coupled to a second terminal and to the first relay, wherein a second power source is coupleable with the second terminal. A load is electrically coupled with at least one of: the first terminal, the second terminal, and a third power source, wherein a power supply is provided to the load by the first power source in the case that the first power source is electrically coupled to the first terminal. The power supply is provided to the load by the second power source when the second power source is electrically coupled to the second terminal and the first power source is disconnected from the first terminal. Otherwise the load is supplied by the third power source.

One exemplary approach in accordance with the present disclosure may include a system having a load including a rechargeable battery, a first relay electrically coupled to the rechargeable battery and a first terminal, wherein a first power source is coupleable with the first terminal. The system may further include a second relay electrically coupled to a second terminal, wherein a second power source is coupleable with the second terminal, and wherein the load is coupled with at least one of the following in the case that a battery charger coupled to the rechargeable battery detects a voltage of the rechargeable auxiliary battery is below a predetermined threshold: the first terminal, the second terminal, and a third power source, wherein a power supply is provided to the load by the first power source in the case that the first power source is electrically coupled to the first terminal.

Another exemplary approach in accordance with the present disclosure may include a load including a rechargeable battery, and a circuit having a first relay electrically coupled to a first terminal, wherein a first direct current (DC) power source is coupleable with the first terminal. The circuit may further include a second relay connected to the rechargeable battery and the first relay by a power line, wherein the second relay is electrically coupled to a second terminal, and wherein a second DC power source is coupleable with the second terminal. The load is electrically coupled with at least one of the following in the case that a battery charger electrically coupled to the rechargeable battery detects a voltage of the rechargeable auxiliary battery is below a predetermined threshold: the first terminal, the second terminal, and a third DC power source, wherein a power supply is provided to the load by the first power source in the case that the first power source is electrically coupled to the first terminal.

Another exemplary approach in accordance with the present disclosure may include a method for selecting between a plurality of power sources, including electrically coupling a first relay to a first terminal, wherein a first power source is coupleable with the first terminal. The method may further include electrically coupling a second relay to a second terminal, wherein a second power source is coupleable with the second terminal, and monitoring a load voltage of a rechargeable auxiliary battery. The method may further include providing a power supply to the rechargeable auxiliary battery from one of the following in the case that a battery charger coupled to the rechargeable auxiliary battery detects a voltage of the rechargeable auxiliary battery is below a predetermined threshold: the first power source, the second power source, and a third power source. The power supply is provided to the rechargeable auxiliary battery by the first power source in the case that the first power source is electrically coupled to the first terminal, and the power supply is provided to the rechargeable auxiliary battery by the second DC power source in the case that the second DC power source is electrically coupled to the second terminal and the first power source is disconnected from the first terminal.

Figure 1:
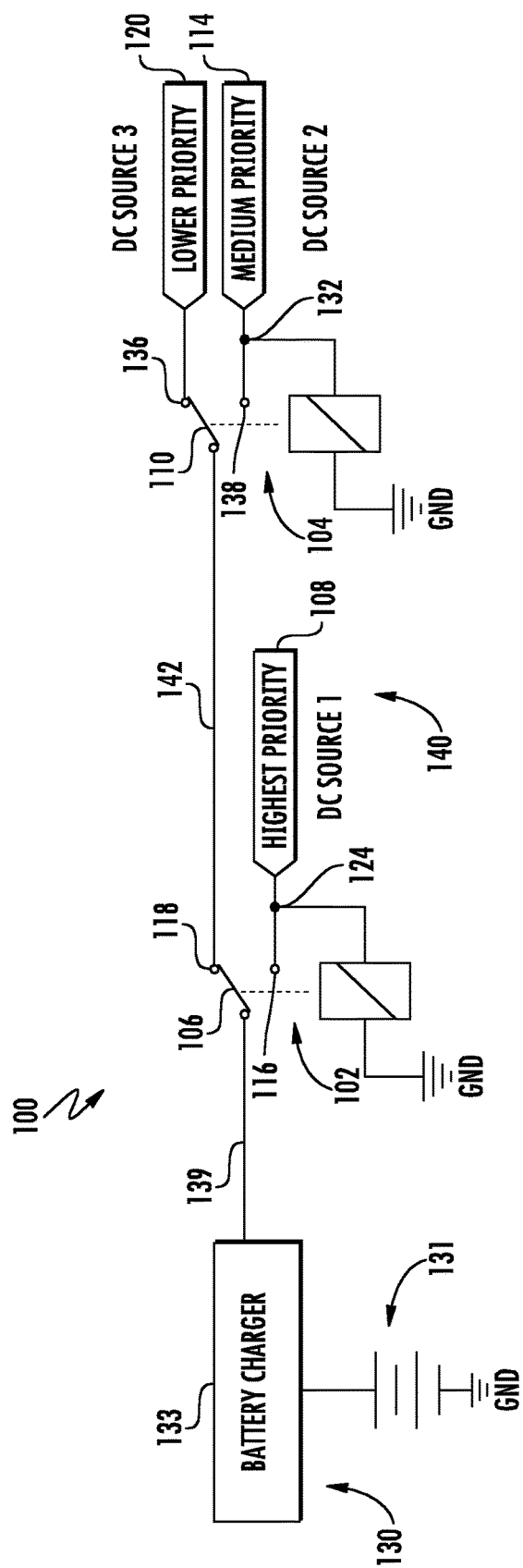
FIG. 1 is a schematic of a system including relays for distributing a load between multiple sources according to exemplary embodiments.

The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

Furthermore, certain elements in some of the figures may be omitted, or illustrated not-to-scale, for illustrative clarity. Furthermore, for clarity, some reference numbers may be omitted in certain drawings.

DETAILED DESCRIPTION

Embodiments in accordance with the present disclosure will now be described more fully hereinafter with reference to the accompanying drawings. The system/circuit may be embodied in many different forms and should not be construed as being limited to the embodiments set forth herein. Rather, these embodiments are provided so that this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of various components and their constituent parts. Said terminology will include the words specifically mentioned, derivatives thereof, and words of similar import.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

Embodiments herein may be described in the non-limiting context of a trailer including a liftgate having a battery nearby (e.g., the back of the trailer) to power the liftgate. Trailers don't generally have an onboard means to recharge the liftgate battery. There may be several different sources of charging power available, but trailers typically aren't hard wired to a single source. Since two power sources could come from the tractor and a third could come from the trailer itself, and the trailer is not permanently connected to a tractor, it is beneficial if the owner could designate which sources are the best of multiple power sources to charge its battery, and the system would select the one to use without any user intervention.

For example, one common power source is from a seven-way connector for trailer tail lights. The drawback to hard wiring to this seven-way power source is that it is not intended to supply the amount of electrical current needed to charge the liftgate battery, which results in a significant voltage drop in the long wire runs between the tractor and the rear of the trailer, as well as slow rate of charge and inadequate charging. Some tractors have a separate heavy duty battery power connection in addition to the seven way connection, which is intended to supply higher currents. The drawback to hard wiring to this heavy duty batter power source is that not all tractors supply power to this connection. A third power source could come from an alternator and battery of a trailer equipped with a refrigeration unit. The drawback to hard wiring to this power source is that not all trailers have a refrigeration unit. It is with at least this in mind, that the present disclosure advantageously allows connection to three or more different charging power sources, prioritized at the time of installation, with the highest priority power source that is available being automatically selected to charge the liftgate battery.

More specifically, in some implementations, a first relay is electrically coupled to a first terminal, wherein a first power source is coupleable with the first terminal. A second relay is electrically coupled to a second terminal and to the first relay, wherein a second power source is coupleable with the second terminal. A load is electrically coupled with at least one of: the first terminal, the second terminal, and a third power source, wherein a power supply is provided to the load by the first power source in the case that the first power source is electrically coupled to the first terminal. The power supply is provided to the load by the second power source when the second power source is electrically coupled to the second terminal and the first power source is disconnected from the first terminal. Otherwise the load is supplied by the third power source.

Referring now to FIG. 1, a schematic of a circuit/system (hereinafter, system 100) in accordance with the present disclosure will be described in greater detail. In exemplary embodiments, the system 100 includes one or more electrical switches, such as electromagnetic or solid-state relays, for selecting a load among multiple power sources. The relays may be operable in a location where multiple DC power sources will be supplied to a load (e.g., a system, battery, battery charger, or power management device within a vehicle), and there is a prioritization of which power source is the one that should be used, if present.

In some embodiments, the relays don't intelligently select the loads; they simply switch to a preordained most desirable power source available, which may be determined by the relative arrangement of the various power sources. When a power source is determined to be the most desirable of the group, it is automatically connected to. However, when the primary power source is not present, or is unavailable for whatever reason, a second most desirable power source is selected in default. This continues until the least desirable power source is the only power source available to supply electrical current to the load.

As shown in FIG. 1, the system 100 includes a first relay 102 and a second relay 104 operating within a circuit 140, each of the first and second relays 102, 104 coupled to ground. The first relay 102 includes a relay coil or relay contactor 106, and is coupled to a first DC power source 108. Meanwhile, the second relay 104 includes a relay contactor 110, and is coupled to a second DC power source 114. The relay contactor 106 operates between a first contact pin 116, which is electrically coupled to the first DC power source 108, and a second contact pin 118, which is electrically coupled to a third DC power source 120 via the relay contactor 110 and a power line 142.

The system 100 further includes a load 130, which may include a rechargeable battery 131 (e.g., a lift gate battery that powers a lift gate motor) and optionally a battery charger 133. During operation, the battery charger 133 monitors a voltage of the rechargeable battery 131, and ensures that the voltage is maintained at a predetermined acceptable level. In one embodiment, the battery charger 133 may include a microprocessor-based control module to monitor voltage of the rechargeable battery to ensure an adequate charge is maintained.

In the case that the connection 139 is closed, the presence of the first DC power source 108 at a first terminal 124 energizes the first relay 102 and associated relay contactor 106, thus actuating the relay contactor 106 from a normally closed first position in contact with the second contact pin 118 (as shown), towards a second position in contact with the first contact pin 116. This modifies a connection between the load 130 and the third DC power source 120. In other words, current supplied to the load 130 is switched from the third DC power source 120 to the first DC power source 108 when it is determined the first DC power source 108 is connected.

Similarly, the presence of the second DC power source 114 at a second terminal 132 energizes the second relay 104 and associated relay contactor 110, thus actuating the relay contactor 110 from a normally closed first position in contact with a first contact pin 136 (as shown), towards a second position in contact with a second contact pin 138. This modifies a connection between the load 130 and the third DC power source 120. In other words, current for the load 130 is switched from the third DC power source 120 to the second DC power source 114 when it is determined the second DC power source 114 is connected, and the first DC power source 108 is disconnected from the first terminal 124.

As arranged, the system 100 prioritizes each of the first, second, and third DC power sources 108, 114 and 120 based on an arrangement/configuration within the circuit 140 and/or relative proximity to the load 130. In some embodiments, this prioritization is done without the use of a processor or controller. Instead, as shown in FIG. 1, the first DC power source 108 is given highest priority, as the first DC power source 108 is positioned closest to the load 130 and may be electrically coupled to the load 130 in the case that a closed circuit is formed by the relay contactor 106. In the case that the first DC power source 108 is connected to the first terminal 124, current is supplied from the first DC power source 108. Otherwise, the load 130 is electrically coupled to the second relay 104 via the power line 142.

This process continues until the lowest priority power source is the only power source available to supply electrical current to the load 130. For example, in the case that the second DC power source 114 is connected to the second terminal 132, current is supplied from the second DC power source 114 through the second relay 104. Otherwise, the load 130 is electrically coupled to the third DC power source 120 via the contactor 110. In this sense, the second DC power source 114 is given "medium priority," while the third DC power source 120 is given "lowest priority." The third DC power source 120 is selected only in the case that the first and second DC power sources 108 and 114 are unavailable.

Figure 2:
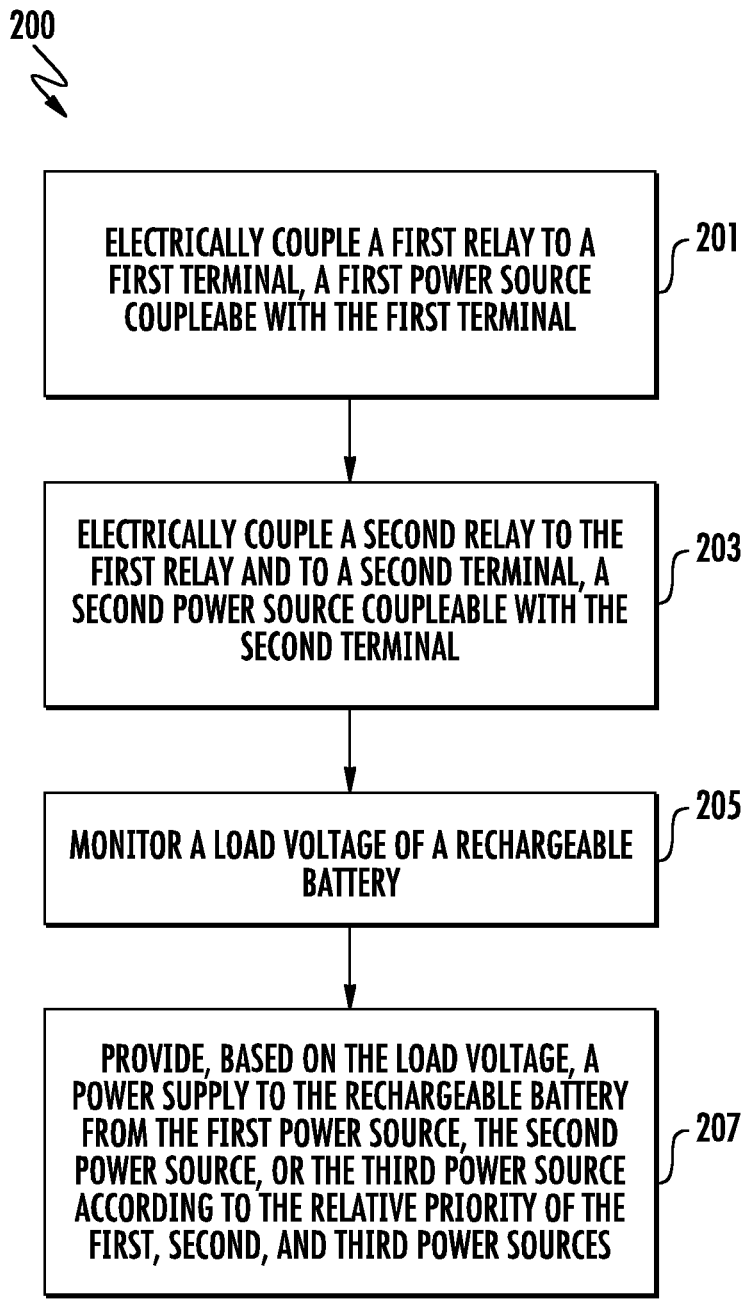
FIG. 2 is a method for distributing a load using the system of FIG. 1 according to exemplary embodiments.

Turning now to FIG. 2, a method 200 for selecting between a plurality of power sources according to exemplary embodiments will be described in greater detail. The method 200 includes electrically coupling a first relay to a first terminal, wherein a first power source is coupleable with the first terminal, as shown at block 201. In some embodiments, the first relay is coupled to ground, and includes a first relay contactor operable for switching between a first contact pin electrically connected to the first terminal, and a second contact pin electrically connected to the second relay. In some embodiments, the first power source is a DC power source.

The method 200 further includes electrically coupling a second relay to a second terminal, wherein a second power source is coupleable with the second terminal, as shown at block 203. In some embodiments, the second relay is coupled to ground, and includes a second relay contactor operable for switching between a first contact pin electrically connected to the second terminal, and a second contact pin electrically connected to a third power source. In some embodiments, the second and third power sources are DC power sources.

The method 200 further includes monitoring a load voltage of a rechargeable auxiliary battery, as shown at block 205. The method 200 further includes providing a power supply to the load from one of the following in the case that the load voltage drops below a predetermined threshold: the first power source, the second power source, or the third power source, as shown in block 207. In some embodiments, the power supply is provided to the load by the first power source in the case that the first power source is electrically coupled to the first terminal, and wherein the power supply is provided to the load by the second DC power source in the case that the second DC power source is electrically coupled to the second terminal and the first power source is disconnected from the first terminal.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A system, comprising:
   a load including a rechargeable battery;
   a first relay electrically coupled to the rechargeable battery and a first terminal, wherein a first power source is coupleable with the first terminal;
   a second relay electrically coupled to a second terminal, wherein a second power source is coupleable with the second terminal; and
   a first relay contactor of the first relay, the first relay contactor operable for switching between a first contact pin electrically connected to the first terminal, and a second contact pin electrically connected in series to a second relay contactor of the second relay,
   wherein the load is coupled with at least one of the following in the case that a battery charger coupled to the rechargeable battery detects a voltage of the rechargeable battery is below a predetermined threshold: the first terminal, the second terminal, and a third power source, wherein a power supply is provided to the load by the first power source in the case that the first power source is electrically coupled to the first terminal.

2. The system of claim 1, wherein the power supply is provided to the load by the second power source in the case that the second power source is electrically coupled to the second terminal and the first power source is disconnected from the first terminal.

3. The system of claim 1, wherein the power supply is provided to the load by the third power source in the case that the first power source is disconnected from the first terminal and the second power source is disconnected from the second terminal.

4. The system of claim 1, further comprising a ground connected to each of the first relay and the second relay.

5. The system of claim 1, the second relay contactor operable for switching between a first contact pin electrically connected to the second terminal and a second contact pin electrically connected to the third power source.

6. The system of claim 5, wherein at least one of the first relay contactor and the second relay contactor is a coil.

7. The system of claim 1, wherein the first power source, the second power source, and the third power source are direct current (DC) power sources.

8. A circuit, comprising:
   a load including a rechargeable battery;
   a first relay electrically coupled to a first terminal, wherein a first direct current (DC) power source is coupleable with the first terminal; and
   a second relay connected to the rechargeable battery and the first relay by a power line, wherein the second relay is electrically coupled to a second terminal, and wherein a second DC power source is coupleable with the second terminal;
   a first relay contactor of the first relay, the first relay contactor operable for switching between a first contact pin electrically connected to the first terminal, and a second contact pin electrically connected in series to a second relay contactor of the second relay,
   wherein the load is electrically coupled with at least one of the following in the case that a battery charger electrically coupled to the rechargeable battery detects a voltage of the rechargeable battery is below a predetermined threshold: the first terminal, the second terminal, and a third DC power source, wherein a power supply is provided to the load by the first DC power source in the case that the first power source is electrically coupled to the first terminal.

9. The circuit of claim 8, wherein the power supply is provided to the load by the second DC power source in the case that the second DC power source is electrically coupled to the second terminal and the first DC power source is disconnected from the first terminal.

10. The circuit of claim 8, wherein the power supply is provided to the load by the third DC power source in the case that the first power supply is disconnected from the first terminal and the second DC power source is disconnected from the second terminal.

11. The circuit of claim 8, further comprising a ground connected to each of the first and second relays.

12. The circuit of claim 8, the second relay comprising a second relay contactor operable for switching between a first contact pin electrically connected to the second terminal, and a second contact pin electrically connected to the third DC power source.

13. The circuit of claim 12, wherein at least one of the first relay contactor and the second relay contactor is a coil.

14. A method for selecting between a plurality of power sources, comprising:
  electrically coupling a first relay to a first terminal, wherein a first power source is coupleable with the first terminal;
  electrically coupling a second relay to a second terminal, wherein a second power source is coupleable with the second terminal;
  electrically connecting a first contact pin of a first relay contactor of the first relay to the first terminal, and electrically coupling, in series, a second contact pin of the first relay contactor to a second relay contactor of the second relay;
  monitoring a load voltage of a rechargeable auxiliary battery; and
  providing a power supply to the rechargeable auxiliary battery from one of the following in the case that a battery charger coupled to the rechargeable auxiliary battery detects a voltage of the rechargeable auxiliary battery is below a predetermined threshold: the first power source, the second power source, and a third power source,
  wherein the power supply is provided to the rechargeable auxiliary battery by the first power source in the case that the first power source is electrically coupled to the first terminal, and wherein the power supply is provided to the rechargeable auxiliary battery by the second power source in the case that the second power source is electrically coupled to the second terminal and the first power source is disconnected from the first terminal.

15. The method of claim 14, further comprising actuating, in the case that the first power source is electrically coupled to the first terminal, the first relay contactor of the first relay from a first position in contact with a power line to a second position in contact with the first terminal.

16. The method of claim 14, further comprising actuating, in the case that the second power source is electrically coupled to the second terminal and the first power source is not electrically coupled to the first terminal, the second relay contactor of the second relay from a first position in contact with the third power source to a second position in contact with the second terminal.

17. The method of claim 14, further comprising activating the first relay when the first power source is coupled to the first terminal.

18. The method of claim 14, further comprising activating the second relay when the second power source is coupled to the second terminal.

* * * * *